United States Patent
Zhang et al.

(10) Patent No.: US 11,906,833 B1
(45) Date of Patent: Feb. 20, 2024

(54) DISPLAY MODULE AND SPLICED DISPLAY DEVICE

(71) Applicant: HKC CORPORATION LIMITED, Shenzhen (CN)

(72) Inventors: Guangchen Zhang, Shenzhen (CN); Yunyang Liu, Shenzhen (CN); Tingting Shen, Shenzhen (CN); Zhiwei Li, Shenzhen (CN); Li Lv, Shenzhen (CN); Ying Chen, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/365,838

(22) Filed: Aug. 4, 2023

(30) Foreign Application Priority Data

Nov. 9, 2022 (CN) .......................... 202211397486.8

(51) Int. Cl.
 *G02F 1/1333* (2006.01)
 *G02F 1/1335* (2006.01)

(52) U.S. Cl.
 CPC .... *G02F 1/13336* (2013.01); *G02F 1/133504* (2013.01)

(58) Field of Classification Search
 CPC ....................... G02F 1/13336; G02F 1/133504
 See application file for complete search history.

(56) References Cited

U.S. PATENT DOCUMENTS

2017/0286044 A1* 10/2017 Kim ..................... G09G 3/3413
2019/0106544 A1 4/2019 Bao et al.

FOREIGN PATENT DOCUMENTS

| CN | 105408947 | A |   | 3/2016  |     |             |
|----|-----------|---|---|---------|-----|-------------|
| CN | 209543822 | U |   | 10/2019 |     |             |
| CN | 110767101 | A |   | 2/2020  |     |             |
| CN | 111064828 | A |   | 4/2020  |     |             |
| CN | 111627966 | A |   | 9/2020  |     |             |
| CN | 215067626 | U | * | 12/2021 | ... | G02F 1/13357 |

(Continued)

OTHER PUBLICATIONS

English Machine Translation of He, Chinese Pub. No. CN 215 067 626 (Year: 2023).*

(Continued)

*Primary Examiner* — Donald L Raleigh
(74) *Attorney, Agent, or Firm* — Westbridge IP LLC

(57) ABSTRACT

A display module includes a display unit for image displaying and provided with a light-emitting side, the display module further includes an outer encapsulation layer provided on the light-emitting side of the display unit, and is provided to cover at least an edge of the display unit; the outer encapsulation layer is made of self-healing glass material; and a traction assembly including a first connection piece and a second connection piece with magnetic adsorption, the display unit is provided with a splicing portion for splicing the display modules, the first connection piece and the second connection piece are provided in the splicing portion; the first connection piece and the second connection piece are used for providing the outer encapsulation layers of the two spliced display modules with required fusion force when the display modules are spliced.

9 Claims, 5 Drawing Sheets

(56) References Cited

FOREIGN PATENT DOCUMENTS

| CN | 215067626 U | 12/2021 |
| CN | 115527453 A | 12/2022 |

OTHER PUBLICATIONS

First Office Action issued in counterpart Chinese Patent Application No. 202211397486.8, dated Jan. 6, 2023.
Grant Notification issued in counterpart Chinese Patent Application No. 202211397486.8, dated Feb. 7, 2023.
International Search Report and Written Opinion issued in corresponding PCT Application No. PCT/CN2023/094647, dated Sep. 12, 2023.

* cited by examiner (a)

(b)

DISPLAY MODULE AND SPLICED DISPLAY DEVICE

CROSS-REFERENCE TO RELATED APPLICATIONS

This application claims priority to Chinese Patent Application No. 202211397486.8, filed on Nov. 9, 2022, the entire disclosure of which is incorporated herein by reference.

TECHNICAL FIELD

The present disclosure relates to the technical field of display technology, and in particular to a display module and a spliced display device.

BACKGROUND

In the process of social industrialization and informatization, data visualization has become an indispensable part of device such as engineering, computers, and mobile terminals. The technology that the display screens are spliced to obtain a large-screen for image display has been widely used. The display effects such as large-screen display, split-screen display, and high-resolution display brought by the technology improve the work efficiency in teleconferencing, engineering manufacturing, simulation and other fields.

In related technologies, there are mainly two types of splicing technologies for display screens: one is traditional large-screen display wall hard-splicing technology, and the other is projector seamless splicing technology using edge fusion technology. The above two splicing technologies mainly involve digital light processing (DLP) splicing technology, cathode-ray tube (CRT) splicing technology, and plasma display panel (PDP) splicing technology, which will leave obvious splicing gap on the spliced display screen, and the appearance integrity of the spliced display screen is poor.

SUMMARY

The main objective of the present disclosure is to provide a display module, aiming at improving the appearance integrity of splicing between display modules.

In order to achieve the above objective, the present disclosure provides a display module, including: a display unit configured for displaying an image and provided with a light-emitting side; the display module further includes: an outer encapsulation layer; a traction assembly.

In an embodiment, the outer encapsulation layer is provided on the light-emitting side of the display unit, and is provided to cover at least an edge of the display unit, and the outer encapsulation layer is made of self-healing glass material.

In an embodiment, the traction assembly includes a first connection piece and a second connection piece capable of magnetic adsorption.

In an embodiment, the display unit is provided with a splicing portion for splicing display modules, and the first connection piece and the second connection piece are provided inside the splicing portion.

In an embodiment, the first connection piece and the second connection piece are configured to provide the outer encapsulation layers of two spliced display modules with a force required for fusion when two display modules are spliced.

In an embodiment, a photic boundary layer 16 is provided at an outer edge of the splicing portion, and the photic boundary layer 16 is extended towards the outer encapsulation layer and covers a part of an outer edge of the outer encapsulation layer.

In an embodiment, the splicing portion includes a first splicing portion and a second splicing portion provided on the edge of the display unit; the first splicing portion and the second splicing portion are respectively located at two ends of the display unit in a width direction; and the first connection piece and the second connection piece are respectively provided on the first splicing portion and the second splicing portion.

In an embodiment, the splicing portion is provided with at least two accommodating spaces communicated with an outside; and the first connection piece and the second connection piece are movably provided in the two accommodating spaces respectively, and are partially passed through an opening of the accommodating space, the opening of the accommodating space is for communicating with the outside.

In an embodiment, an elastic piece is provided inside the accommodating space, and the elastic piece is connected to a periphery of the opening of the accommodating space and the first connection piece or the second connection piece; and the elastic piece is configured to apply a force in a direction away from the opening of the accommodating space to the first connection piece or the second connection piece.

In an embodiment, the display unit includes: a backlight module, and a display panel provided on the light-emitting side of the backlight module.

In an embodiment, the outer encapsulation layer is provided on a side of the display panel away from the backlight module, and is provided to cover at least an edge of the display panel; and the splicing portion is provided on an edge of the backlight module.

In an embodiment, a chip electrically connected to the display panel is provided inside the backlight module; and the first connection piece and the second connection piece are electrically connected to the chip.

In an embodiment, the display module further includes a dimming film layer; the dimming film layer is provided on the light-emitting side of the display panel, and is located between the outer encapsulation layer and the display panel; and the dimming film layer is configured to guide a light emitted from the display panel to the edge of the display panel.

In an embodiment, a supplementary light source is provided in the backlight module and corresponds to the splicing portion; and the supplementary light source is located at a side of the first connection piece and the second connection piece towards the display panel.

In order to achieve the above objective, the present disclosure further provides a spliced display device, including: at least the two above-mentioned display modules; the first connection piece on one display module is magnetically matched with the second connection piece on another display module to splice the display modules together.

The technical solution of the present disclosure provides a first connection piece and a second connection piece in a splicing portion of the display unit of the display module, the first connection piece and the second connection piece may be magnetically adsorbed with each other. An outer encapsulation layer is provided on a light-emitting side of the display unit of the display module, and the material of the outer encapsulation layer is self-healing glass. In this way, when two display modules with the above structure are spliced together, the first connection piece on one display module can be magnetically matched with the second connection piece on another display module, and under the magnetic adsorption effect of the first connection piece and the second connection piece, the outer encapsulation layers of the two display modules are pulled to be in contact and be squeezed with each other. Further, with the feature of the self-healing glass that can be fused with each other under the action of external force, the edge parts where the outer encapsulation layers of the two display modules are in contact will be integrated, so that the seam between the two display modules can be eliminated in appearance, the seamless splicing of the display modules can be achieved, the appearance integrity of splicing the display modules is improved, and the impressions on the spliced display module is bettered.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only some embodiments of the present disclosure. It will be apparent to those skilled in the art that other figures can be obtained according to the structures shown in the drawings without creative work.

Figure 1:
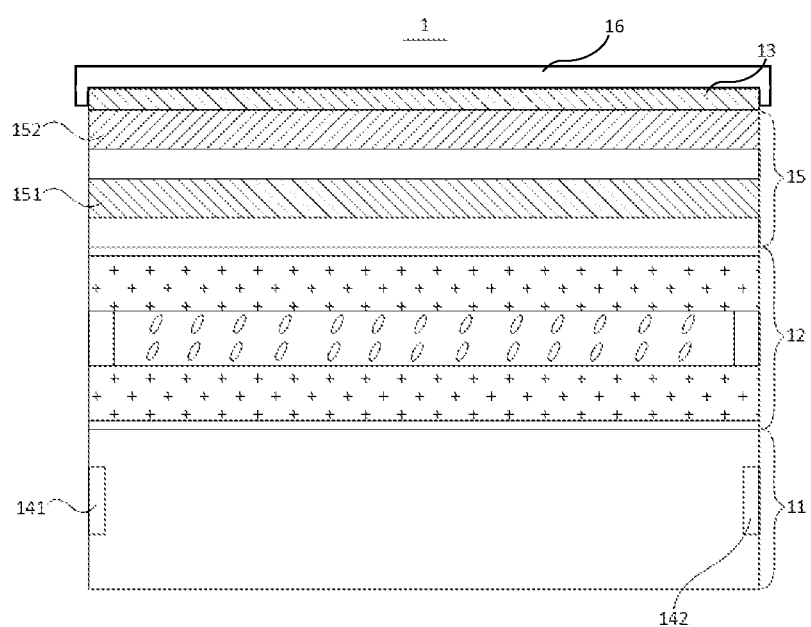
FIG. 1 is a schematic structural view of a display module of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear) in the embodiments of the present disclosure, the directional indication is only used to explain the relative positional relationship, movement, etc. of the components in a certain posture (as shown in the drawings). If the specific posture changes, the directional indication will change accordingly.

In the present disclosure, unless otherwise clearly specified and limited, the terms "connected", "fixed", etc. should be interpreted broadly. For example, "fixed" can be a fixed connection, a detachable connection, or integrated as a whole; it can be a mechanical connection or an electrical connection; it may be directly connected, or indirectly connected through an intermediate medium, and may be the internal communication between two elements or the interaction relationship between two elements, unless specifically defined otherwise. For those skilled in the art in the art, the specific meaning of the above-mentioned terms in the present disclosure can be understood according to specific circumstances.

In addition, the descriptions associated with, e.g., "first" and "second" in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. The meaning of "and/or" appearing in the disclosure includes three parallel scenarios. For example, "A and/or B" includes a scheme A, or a scheme B, or a scheme A and B. Besides, the technical solutions between the various embodiments can be combined with each other, but they must be based on the realization of those skilled in the art. When the combination of technical solutions is contradictory or cannot be achieved, it should be considered that such a combination of technical solutions does not exist, nor is it within the scope of the present disclosure.

First Embodiment

The embodiment of the present disclosure provides a display module 1 as shown in FIG. 1, the display module 1 includes a display unit configured for displaying an image, an outer encapsulation layer 13 and a traction assembly. The display unit may be a liquid crystal display (LCD) display unit, an organic light emitting display (OLED) display unit, etc., the display unit is provided with a light-emitting side configured for displaying the image, the outer encapsulation layer 13 is provided on the light-emitting side of the display unit, and is provided to cover at least the edge of the display unit. The outer encapsulation layer 13 is made of self-healing glass material. The first connection piece 141 and the second connection piece 142 are magnetically adsorbed to each other, the backlight module 11 is provided with a splicing portion for splicing the display modules 1, and the first connection piece 141 and the second connection piece 142 are provided inside the splicing portion. The first connection piece 141 and the second connection piece 142 are configured for providing the outer encapsulation layers 13 of two spliced display modules 1 with a force required for fusion when the two display modules 1 are spliced.

In the embodiment, the outer encapsulation layer 13 is an outside encapsulation structure of the display module 1, which can be bonded to the display unit by optical glue. The outer encapsulation layer 13 is photic and used for protecting the display unit and avoiding damage to the display unit. The outer encapsulation layer 13 may only be provided on the edge of the light-emitting side of the display unit corresponding to the splicing portion, or the outer encapsulation layer 13 may be extended from the edge of the display unit to the display area of the display unit and cover the entire light-emitting side of the display unit. The outer encapsulation layer 13 in the embodiment is applied with self-healing glass material, and the self-healing glass is a photic polymer compound, polyether thiourea. By being squeezed through external force at room temperature, two pieces of self-healing glass will be fused integrally after being in contact for about 30 seconds, and the fused glass as a whole has a structural strength close to that of a single piece of self-healing glass before fusion. In this way, using two display modules 1 with the outer encapsulation layer 13 in the embodiment may be fused of the outer encapsulation layers 13 of the two display modules 1 under the action of external force, so that the splicing seam of the two display modules can be eliminated, and the seamless splicing in the appearance of the two display modules 1 is realized.

The traction assembly is used for connecting and fixing the two display modules 1, and providing the fusion force between the outer encapsulation layers 13 when the two display modules 1 are spliced together. One of the first connection piece 141 and the second connection piece 142 in the traction assembly is a magnetically permeable metal or a magnet, the other of the two is a magnet, and the first connection piece 141 and the second connection piece 142 may be magnetically absorbed with each other. The first connection piece 141 and the second connection piece 142 in a single display module 1 may be provided at intervals to weaken the magnetic adsorption force therebetween, and avoid applying strong force to the structure provided close to the first connection piece 141 and the second connection piece 142 in the backlight module due to the strong magnetic adsorption force between the first connection piece 141 and the second connection piece 142 in a single backlight module. The edge part of the display module 1 is provided with the above splicing portion, such as, the splicing portion may include an outer side of the display module 1 and a partial structure near the ouster side of the display module 1. When the two display modules 1 are spliced together, their splicing portions are abutted against each other. In the spliced two display modules 1, the first connection piece 141 on one display module 1 is magnetically matched with the second connection piece 142 on the other display module 1, so as to provide traction force for the fusion between the outer encapsulation layers 13 of the two display modules 1 when the two display modules 1 are magnetically fixed, which ensures that the two display modules 1 can be accurately aligned, connected and seamlessly spliced in appearance.

The technical solution of the embodiment provides the first connection piece 141 and the second connection piece 142 in the splicing portion of the display unit of the display module 1, the first connection piece 141 and the second connection piece 142 may be magnetically adsorbed with each other. The outer encapsulation layer 13 is provided on a light-emitting side of the display unit of the display module 1, and the material of the outer encapsulation layer 13 is self-healing glass. In this way, when the two display modules with the above structure are spliced together, the first connection piece 141 on one display module 1 can be magnetically matched with the second connection piece 142 on another display module 1, and under the magnetic adsorption effect of the first connection piece 141 and the second connection piece 142, the outer encapsulation layers 13 of the two display modules 1 are pulled to be in contact and be squeezed with each other. Further, with the feature of the self-healing glass that can be fused with each other under the action of external force, the edge parts where the outer encapsulation layers 13 of the two display modules 1 are in contact will be integrated, so that the seam between the two display modules 1 can be eliminated in appearance, the seamless splicing of the display modules 1 can be achieved, the appearance integrity of splicing the display modules 1 is improved, and the impressions on the spliced display module is bettered.

Figure 2:
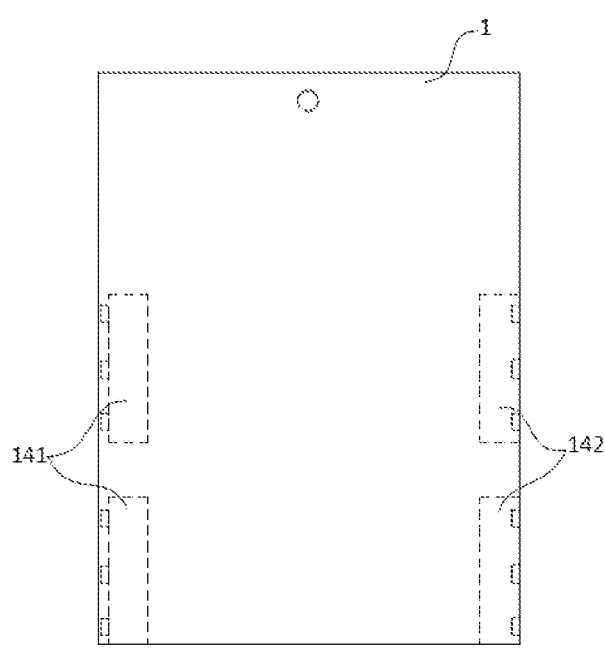
FIG. 2 is a schematic structural view of the display module shown in FIG. 1 in a top view.

In an embodiment of the present disclosure, as shown in FIG. 1 and FIG. 2, the above splicing portion includes the first connection piece 141 and the second connection piece 142 provided on the edge of the display unit; the first connection piece 141 and the second connection piece 142 are provided on two ends of the display unit in a width direction.

Figure 4:
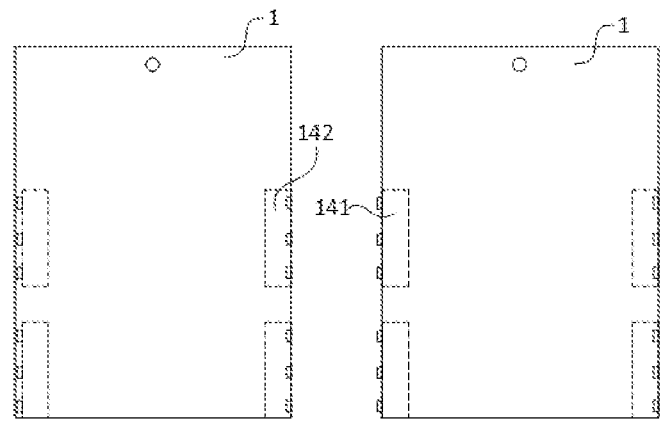
FIG. 4 is a schematic status view of different display modules in a splicing process of the present disclosure.
Figure 4:
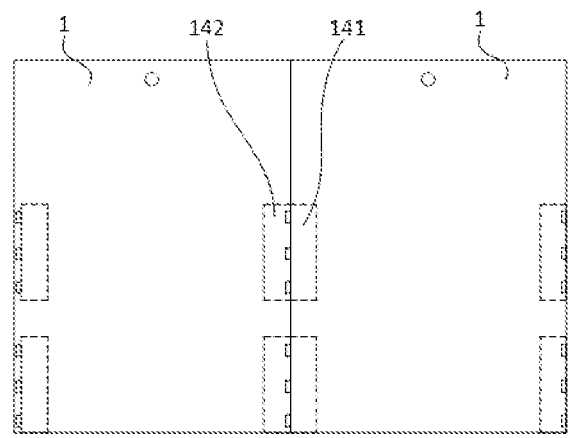

In the embodiment, the first splicing portion and the second splicing portion are provided at two opposite ends of the display unit at intervals, and one of the first connection piece 141 and the second connection piece 142 is provided in the first splicing portion, the other of the first connection piece 141 and the second connection piece 142 is provided in the second splicing portion, so that the first connection piece 141 and the second connection piece 142 are provided at opposite ends of the display module 1 at intervals, when two display modules 1 are spliced together, the two display modules 1 may maintain the same posture to achieve splicing, and other display modules 1 may also be spliced with the two display modules 1 in the same posture, which is convenient to splice and use the display modules 1. In an embodiment, as shown in FIG. 4, when the display module 1 is a mobile phone using a liquid crystal screen, the first connection piece 141 is located at the left end of the liquid crystal screen of the mobile phone, and the second connection piece 142 is located at the right end of the liquid crystal screen of the mobile phone, which may be provided avoid the position of the sensing devices such as infrared sensor on the upper and lower side ends of mobile phone and charging interface. As shown in the part (a) of FIG. 4, when two mobile phones are used in combination, place the two mobile phones in parallel in the same posture, so that the first connection piece 141 on one mobile phone is magnetically fixed to the second connection piece 142 on the other mobile phone, and a combined mobile phone with LCD screens spliced together as shown in the part (b) of FIG. 4 is obtained. When more mobile phones are added to the combination, similarly, multiple mobile phones may be aligned in parallel in the same posture for screen splicing, so as to expand the screen of the mobile phone and realize multi-screen splicing.

In an embodiment of the present disclosure, as shown in FIG. 2, the above splicing portion is provided with at least two accommodating spaces communicated with an outside, the first connection piece 141 and the second connection piece 142 are respectively movably provided in the two accommodating spaces, and can be partly passed through the opening of the accommodating space, the accommodating space is for communicating with the outside.

In the embodiment, the first connection piece 141 and the second connection piece 142 can be slidably connected with the inner wall of the corresponding accommodating space through rail match, and the first connection piece 141 and the second connection piece 142 may be provided with a lever exposed from the display unit. The lever is pulled to drive the first connection piece 141 or the second connection piece 142 to slide out of the accommodating space; or, a pressing pop-up structure composed of buttons, springs and buckles is provided on the display unit. The buckles are located in the accommodating space, and is used to be snapped with the first connection piece 141 or the second connection piece 142. The springs are provided in the accommodating space, and are used to apply a force towards the opening of the accommodating space to the first connection piece 141 and the second connection piece 142. The button is transmissively connected to the buckle, and is partly exposed to the display unit. When the button is pressed, the buckle and the first connection piece 141 in the accommodating space or the second connection piece 142 are separated, so that the first connection piece 141 and the second connection piece 142 are ejected from the accommodating space under the elastic effect of the spring.

In the embodiment, the first connection piece 141 and the second connection piece 142 are movably provided in the accommodating space, and the first connection piece 141 and the second connection piece 142 may be slided out through the opening of the accommodating space. When the module 1 is used for splicing, the first connection piece 141 and the second connection piece 142 are removed from the display unit 11 for the splicing the display module 1; when the display module 1 does not need to be spliced, the first connection piece 141 and the second connection piece 142 are accommodated and protected by the accommodating space. In addition, a protective cover may also be covered on the opening of the accommodating space to protect the first connection piece 141, the second connection piece 142 and the display unit from water and dust.

In an embodiment of the present disclosure, as shown in FIG. 2, an elastic piece is provided inside the accommodating space, and the elastic piece is connected to the periphery of the opening of the accommodating space and the first connection piece 141 or the second connection piece 142. The elastic piece is configured to apply a force in a direction away from the opening of the accommodating space to the first connection piece 141 or the second connection piece 142.

In the embodiment, the elastic piece is located between the opening of the accommodating space and the first connection piece 141 or the second connection piece 142, and the elastic piece drives the first connection piece 141 or the second connection piece 142 to move into the accommodating space, so that the first connection piece 141 or the second connection piece 142 is reliably accommodated in the accommodating space. When the two display modules 1 are spliced together, the splicing portions of the two display modules 1 are in contact, and the accommodating space accommodated with the first connection piece 141 on one display module 1 is corresponded to the accommodating space accommodated with second connection piece 142 on the other display module 1. The first connection piece 141 and the second connection piece 142 work against the elastic force of the corresponding elastic piece under the mutual magnetic adsorption force, the first connection piece 141 and the second connection piece 141 are adsorbed with each other and compress the elastic parts in the two accommodating spaces, so as to realize the splicing of the two display modules 1. In addition, under the magnetic adsorption of the first connection piece 141 and the second connection piece 142, the edges of the outer encapsulation layer 13 of the two display modules 1 are fused, and the two display modules 1 are pulled closer due to the fusion of edges of the outer encapsulation layer 13. At this time, under the action of the elastic piece, the magnetically adsorbed first connection piece 141 and the second connection piece 142 will shrink inward for a certain distance into their respective accommodating spaces to adaptively match the distance where the two display modules 1 are pulled closer, so as to avoid fusion of the outer encapsulation layers 13 of the two display modules 1. When the first connection piece 141 and the second connection piece 142 are protruded from the edge of the splicing portion, that is, the edge of the display unit, the edges of the two display modules 1 cannot maintain a parallel contact state, so that a certain splicing angle is shown between the two display modules 1, and the display surfaces of the two display modules 1 cannot be kept parallel.

In an embodiment of the present disclosure, as shown in FIG. 1 and FIG. 2, the above-mentioned display unit includes a backlight module 11 and a display panel 12 provided on the light-emitting side of the backlight module 11; the outer encapsulation layer 13 is provided on the side of the display panel 12 away from the backlight module 11 and is provided to cover at least the edge of the display panel 12, and the splicing portion is provided on the edge of the backlight module 11.

In the embodiment, the display unit is a liquid crystal display unit, that is, an LCD display unit, which includes a display panel 12 and a backlight module 11 that provides a backlight source for the display surface 12. The outer encapsulation layer 13 may only be provided on the edge of the light-emitting side of the display panel 12 corresponding to the splicing portion, or the outer encapsulation layer 13 may be extended from the edge of the display panel 12 to the display area of the display panel 12 and cover the entire light-emitting surface of the display panel 12.

The liquid crystal display unit cannot be bezel-less like OLED, MicroLED, MiniLED and other display units due to the existence of the frame glue and the film layer with poor light transmission at the edge portion. In the embodiment, by combining the above traction assembly and the outer encapsulation layer 13 into the liquid crystal display unit, it is possible to realize the seamless splicing of the appearance of the two liquid crystal display units when the liquid crystal display unit possess a bezel, and solve the problem that the liquid crystal display units are difficult to be seamlessly spliced when splicing. In addition, the first connection piece 141 and the second connection piece 142 are built into the backlight module 11, making full use of the spare space in the backlight module 11, improving the space utilization rate in the backlight module 11, avoiding the first connection piece 141 and the second connection piece 142 to block the optical path in the display panel 12, and ensuring the display quality of the display panel 12.

Figure 3:
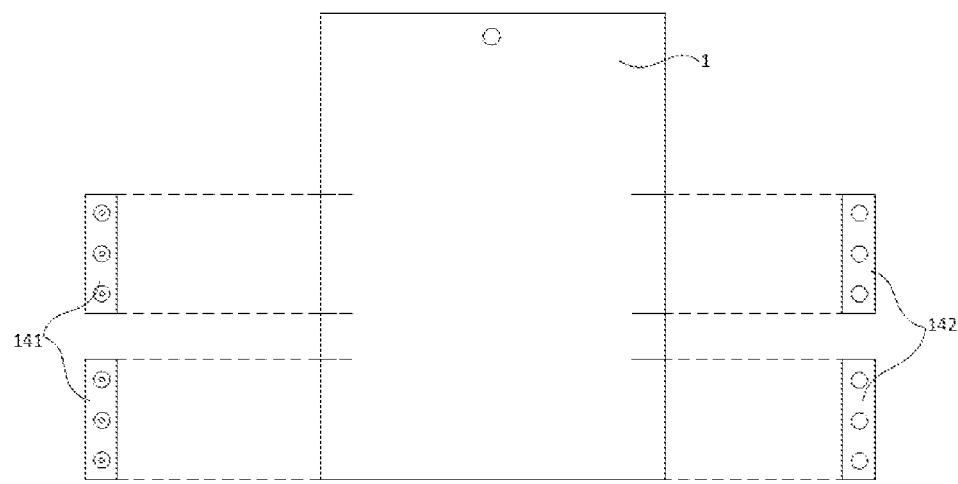
FIG. 3 is a schematic structural view of the display module shown in FIG. 2 in a status of removing a traction assembly.

In one embodiment of the present disclosure, as shown in FIG. 2 and FIG. 3, the above backlight module 11 is provided with a chip electrically connected to the display panel 12; the first connection piece 141 and the second connection piece 142 are electrically connected to the chip.

In the embodiment, the binding area of the display panel 12 is connected to the chip used to drive the display panel 12 in the backlight module 11 through a flexible flat cable, and the first connection piece 141 and the second connection piece 142 in the backlight module 11 are connected to the chips in the backlight module 11 through circuit structures such as flexible flat cables and metal layers. In this way, when the two display modules 1 are spliced together, the first connection piece 141 and the second connection piece 142 on the two display modules 1 are magnetically connected, and the first connection piece 141 and the second connection piece 142 are designed as a conductive structure, such as using magnetic connectors as the first connection piece 141 and the second connection piece 142, the electrical conduction between the display modules 1 can be realized through the first connection piece 141 and the second connection piece 142 on the two display modules 1. Then, the chips in the two display modules 1 may realize mutual signal transmission, so as to achieve the transmission of the driving signals between the two display modules 1 and the synchronous splicing of the display images, which can improve the performance of the two display modules after being spliced.

In an embodiment of the present disclosure, as shown in FIG. 1, the above display module 1 further includes a dimming film layer 15 provided on the light-emitting side of the display panel, and is located between the outer encapsulation layer and the display panels 12, and the dimming film layer 15 is configured to guide a light emitted from the display panel 12 to the edge of the display panel 12.

In the embodiment, the dimming film layer 15 may include one or more film layer structures, for example, the dimming film layer 15 may include one or more layers of light-scattering films. The dimming film layer 15 changes the propagation direction of the emitting light of the display panel 12, so that the emitting light of the display panel 12 is diverged to the edge of the display panel 12, so that the display screen of the display panel 12 may be extended to the edge area of the display panel 12. When the two display modules 1 are spliced together, the above dimming function of the two display modules 1 can be used to display pictures in the splicing area of the two display modules 1, thereby realizing seamless splicing of the display pictures.

In an embodiment, the dimming film layer 15 includes a diffusion sheet 151 and a brightness enhancement film 152, the diffusion sheet 151 is located between the brightness enhancement film 152 and the display panel 12, and the brightness enhancement film 152 is located between the diffusion sheet 151 and the outer encapsulation layers 13. The diffusion sheet 151 diverges and homogenizes the emitting light of the display panel 12 to enlarge the light emitting area of the display panel 12. The brightness enhancement film 152 gathers the emitting light of the diffusion sheet 151 in a specific light emitting range, so that the display picture of the display panel 12 covers the edge of the display panel 12 and enhances the clarity of the picture display, and realizes the seamless splicing effect on the display picture when the above two display modules 1 are spliced together with a relatively simple composite film layer structure.

In an embodiment of the present disclosure, as shown in FIG. 1, a photic boundary layer 16 is provided at an outer edge of the above splicing portion, and the photic boundary layer 16 is extended toward the outer encapsulation layer 13 and covers part of an outer edge of the encapsulation layer 13.

In the embodiment, after the two display modules 1 are spliced together, due to the existence of the photic boundary layer 16 on the two display modules 1, a photic boundary layer 16 is included between the outer encapsulation layers 13 of the two display modules 1. The outer encapsulation layer 13 of the two display modules 1 may only be partially fused, which reduces the fusion thickness and area of the outer encapsulation layer 13 of the two display modules 1 to a certain extent, and weakens the entire fusion strength of the outer encapsulation layers 13 of the two display modules 1, which allows the two display modules 1 that are spliced together to be separated from each other to be used or recycled separately by moving the two display modules 1. The photic boundary layer 16 can be made of a photic metal material, such as indium tin oxide, so that the photic boundary layer 16 has sufficient rigidity to ensure the uniformity of the edges of the two spliced display modules 1 after being detached with each other. Then, the fusion strength of the outer encapsulation layer 13 of the two spliced display modules 1 may be weakened by making the photic boundary layer 16 cover a wider range or a larger area of the edge of the outer encapsulation layer 13, so as to ensure the uniformity of the two spliced display modules 1 after being detached.

In one embodiment of the present disclosure, as shown in FIG. 1, a supplementary light source is provided in the backlight module and corresponds to the splicing portion, and the supplementary light source is located at a side of the first connection piece 141 and the second connection piece 142 towards the display panel 12.

In the embodiment, due to the existence of structures with insufficient transmittance such as rubber frames in the edge of the display panel 12 in the display module 1, the light emitting intensity of the spliced two display modules 1 in the seam area is insufficient. Therefore, in the embodiment, supplementary light sources such as LED light strips or lamp panels are provided inside the backlight module 11 to provide backlight to the edge of the display panel 12, and the light emitting intensity of the two spliced display modules 1 in the seam area is enhanced. Besides, the brightness of the display screens of the two display modules 1 that are spliced in the seam area is improved, so that the light emitting intensity of each place on the light emitting surface of the spliced display modules is uniform, and the display effect of the spliced display modules is also improved.

Second Embodiment

Figure 5:
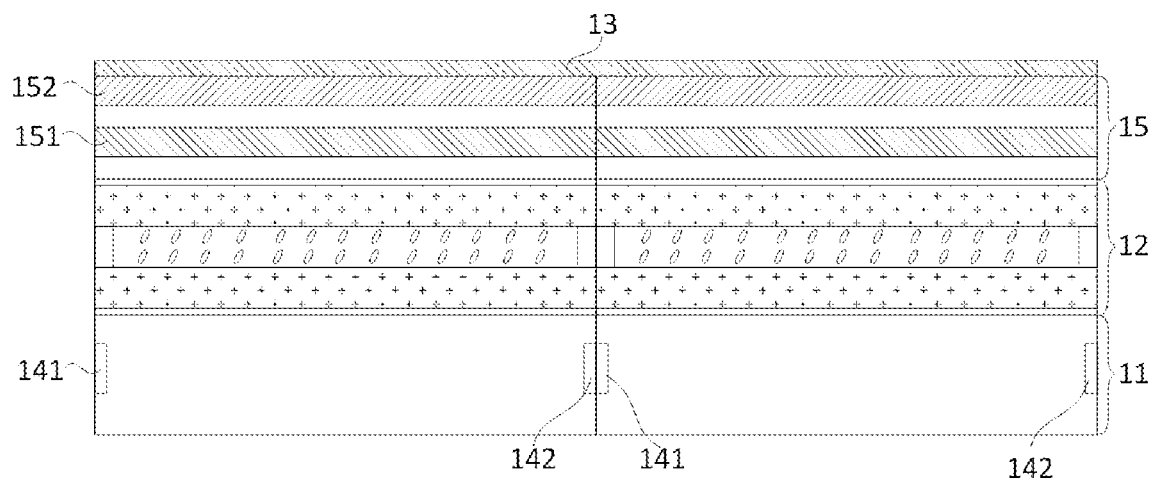
FIG. 5 is a schematic structural view of a spliced display device of the present disclosure.

The embodiment of the present disclosure provides a spliced display device, as shown in FIG. 5, the above spliced display device includes at least two of the above display modules 1. The first connection piece 141 on one display module 1 is magnetically matched with the second connection piece 142 on the other display module 1 to splice each display module 1.

In the embodiment, two or more spliced display modules 1 may realize the electrical signal and data transmission by the first connection piece 141 and the second connection piece 142 electrically connected to the chip and the display panel 12 in the backlight module 11, in this way, take two display modules 1 being spliced to form a spliced display device as an example: on the one hand, a large-screen image display can be realized through splicing; on the other hand, one of the display modules can be used to supply power for another display module 1 that lacks power to increase the battery life of the display module 1 that lacks power. Secondly, one of the display modules 1 can be used as a display, and the other display module 1 can be used as an outer operator, such as a keyboard or handle, to control the operation of the display module 1 as a display, so as to be suitable for office, playing games and other scenarios. Moreover, it is also possible to realize two display modules by charging one of the display modules 11 at the same time; finally, one of the display modules 1 can also import the external storage data into the other display module 1, or exchange data between the two display modules 1 to share data.

For the specific structure of the display module 1 in the embodiment, please refer to the above embodiments. Since the spliced display device adopts all the technical solutions of all the above-mentioned embodiments, it at least possesses all the beneficial effects brought by the technical solutions of the above-mentioned embodiments. No more details here.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A display module, comprising:
   a display unit configured for displaying an image and provided with a light-emitting side;
   wherein the display module further comprises:
   an outer encapsulation layer;
   a traction assembly;
   wherein the outer encapsulation layer is provided on the light-emitting side of the display unit, and is provided to cover at least an edge of the display unit, and the outer encapsulation layer is made of self-healing glass material;
   the traction assembly comprises a first connection piece and a second connection piece capable of magnetic adsorption;
   the display unit is provided with a splicing portion for splicing display modules, and the first connection piece and the second connection piece are provided inside the splicing portion;
   the first connection piece and the second connection piece are configured to provide the outer encapsulation layers of two spliced display modules with a force required for fusion when the two display modules are spliced; and
   a photic boundary layer is provided at an outer edge of the splicing portion, and the photic boundary layer is extended towards the outer encapsulation layer and covers a part of an outer edge of the outer encapsulation layer.

2. The display module of claim 1, wherein the splicing portion comprises a first splicing portion and a second splicing portion provided on the edge of the display unit;
   the first splicing portion and the second splicing portion are respectively located at two ends of the display unit in a width direction; and
   the first connection piece and the second connection piece are respectively provided on the first splicing portion and the second splicing portion.

3. The display module of claim 1, wherein the splicing portion is provided with at least two accommodating spaces communicated with an outside; and
   the first connection piece and the second connection piece are movably provided in the two accommodating spaces respectively, and are partially passed through an opening of the accommodating space, wherein the opening of the accommodating space is for communicating with the outside.

4. The display module of claim 3, wherein an elastic piece is provided inside the accommodating space, and the elastic piece is connected to a periphery of the opening of the accommodating space and the first connection piece or the second connection piece; and
   the elastic piece is configured to apply a force in a direction away from the opening of the accommodating space to the first connection piece or the second connection piece.

5. The display module of claim 1, wherein the display unit comprises:
   a backlight module, and
   a display panel provided on the light-emitting side of the backlight module;
   the outer encapsulation layer is provided on a side of the display panel away from the backlight module, and is provided to cover at least an edge of the display panel; and
   the splicing portion is provided on an edge of the backlight module.

6. The display module of claim 5, wherein a chip electrically connected to the display panel is provided inside the backlight module; and
   the first connection piece and the second connection piece are electrically connected to the chip.

7. The display module of claim 5, wherein the display module further comprises a dimming film layer;
   the dimming film layer is provided on the light-emitting side of the display panel, and is located between the outer encapsulation layer and the display panel; and
   the dimming film layer is configured to guide a light emitted from the display panel to the edge of the display panel.

8. The display module of claim 5, wherein a supplementary light source is provided in the backlight module and corresponds to the splicing portion; and
   the supplementary light source is located at a side of the first connection piece and the second connection piece towards the display panel.

9. A spliced display device, comprising:
   at least two display modules of claim 1;
   wherein the first connection piece on one display module is magnetically matched with the second connection piece on another display module to splice the display modules together.

* * * * *